(12) United States Patent
Seifert

(10) Patent No.: US 11,244,564 B2
(45) Date of Patent: Feb. 8, 2022

(54) VEHICLE ACOUSTIC-BASED EMERGENCY VEHICLE DETECTION

(71) Applicant: MAGNA ELECTRONICS INC., Auburn Hills, MI (US)

(72) Inventor: Heinz B. Seifert, Ortonville, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 643 days.

(21) Appl. No.: 15/878,512

(22) Filed: Jan. 24, 2018

(65) Prior Publication Data

US 2018/0211528 A1    Jul. 26, 2018

Related U.S. Application Data

(60) Provisional application No. 62/450,680, filed on Jan. 26, 2017.

(51) Int. Cl.
*G08G 1/0965* (2006.01)
*B60W 30/08* (2012.01)
(Continued)

(52) U.S. Cl.
CPC ............ *G08G 1/0965* (2013.01); *B60Q 9/00* (2013.01); *B60W 30/08* (2013.01);
(Continued)

(58) Field of Classification Search
None
See application file for complete search history.

(56) References Cited

U.S. PATENT DOCUMENTS

| 3,997,868 A | 12/1976 | Ribnick et al. |
| 4,930,742 A | 6/1990 | Schofield et al. |

(Continued)

FOREIGN PATENT DOCUMENTS

| DE | 102013004271 A1 | 9/2013 |
| WO | 1998017046 | 4/1998 |

(Continued)

OTHER PUBLICATIONS

Real F.D., Berry F. (2009) Smart Cameras: Technologies and Applications. In: Belbachir A. (eds) Smart Cameras. Springer, Boston, MA. 2009 (Year: 2009).*

(Continued)

*Primary Examiner* — Peter D Nolan
*Assistant Examiner* — Demetra R Smith-Stewart
(74) *Attorney, Agent, or Firm* — Honigman LLP

(57) ABSTRACT

An emergency vehicle detection system for a vehicle includes a plurality of camera assemblies having a camera and at least one microphone. At least one processor processes image data captured by the cameras, and processes outputs of the microphones. The at least one processor processes the outputs of the microphones to detect a sound source indicative of a siren emanating from an emergency vehicle exterior of the equipped vehicle, and to determine the direction of the detected sound source. Responsive to detection of the sound source and determination of the direction of the detected sound source, the at least one processor processes image data captured by at least one of the cameras that has its field of view encompassing the detected sound source to confirm that the detected sound source is a siren emanating from an emergency vehicle.

18 Claims, 4 Drawing Sheets

(51) Int. Cl.
  *G06K 9/00* (2006.01)
  *G06K 9/20* (2006.01)
  *G06K 9/78* (2006.01)
  *B60Q 9/00* (2006.01)
  *H04R 1/40* (2006.01)
  *H04R 3/00* (2006.01)

(52) U.S. Cl.
  CPC ..... *G06K 9/00791* (2013.01); *G06K 9/00805* (2013.01); *G06K 9/209* (2013.01); *G06K 9/78* (2013.01); *H04R 1/406* (2013.01); *H04R 3/005* (2013.01); *B60W 2420/42* (2013.01); *B60W 2420/54* (2013.01); *B60W 2554/00* (2020.02); *B60W 2710/18* (2013.01); *B60W 2710/20* (2013.01); *H04R 2499/13* (2013.01)

(56) References Cited

U.S. PATENT DOCUMENTS

| | | |
|---|---|---|
| 4,956,866 A | 9/1990 | Bernstein et al. |
| 4,959,865 A | 9/1990 | Stettiner et al. |
| 4,975,966 A | 12/1990 | Sapiejewski |
| 5,287,411 A | 2/1994 | Hill et al. |
| 5,329,593 A | 7/1994 | Lazzeroni et al. |
| 5,495,242 A | 2/1996 | Kick et al. |
| 5,550,677 A | 8/1996 | Schofield et al. |
| 5,670,935 A | 9/1997 | Schofield et al. |
| 5,671,996 A | 9/1997 | Bos et al. |
| 5,703,957 A | 12/1997 | McAteer |
| 5,820,245 A | 10/1998 | Desmond et al. |
| 5,828,012 A | 10/1998 | Repolle et al. |
| 5,850,016 A | 12/1998 | Jung et al. |
| 5,877,897 A | 3/1999 | Schofield et al. |
| 5,878,147 A | 3/1999 | Killion et al. |
| 5,894,279 A | 4/1999 | Rose et al. |
| 5,949,331 A | 9/1999 | Schofield et al. |
| 5,979,586 A | 11/1999 | Farmer et al. |
| 6,166,625 A | 12/2000 | Teowee et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,329,925 B1 | 12/2001 | Skiver et al. |
| 6,362,749 B1 | 3/2002 | Brill |
| 6,363,156 B1 | 3/2002 | Roddy |
| 6,366,213 B2 | 4/2002 | DeLine et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,485,081 B1 | 11/2002 | Bingle et al. |
| 6,501,387 B2 | 12/2002 | Skiver et al. |
| 6,570,992 B1 | 5/2003 | Folan et al. |
| 6,614,911 B1 | 9/2003 | Watson et al. |
| 6,648,477 B2 | 11/2003 | Hutzel et al. |
| 6,690,268 B2 | 2/2004 | Schofield et al. |
| 6,693,517 B2 | 2/2004 | McCarthy et al. |
| 6,717,524 B2 | 4/2004 | DeLine et al. |
| 6,774,356 B2 | 8/2004 | Heslin et al. |
| 6,798,890 B2 | 9/2004 | Killion et al. |
| 6,882,734 B2 | 4/2005 | Watson et al. |
| 6,906,632 B2 | 6/2005 | DeLine et al. |
| 6,958,707 B1 | 10/2005 | Siegel |
| 6,980,092 B2 | 12/2005 | Turnbull et al. |
| 6,980,663 B1 | 12/2005 | Linhard |
| 7,038,577 B2 | 5/2006 | Pawlicki et al. |
| 7,061,402 B1 | 6/2006 | Lawson |
| 7,245,232 B1 | 7/2007 | Caouette, Sr. |
| 7,308,341 B2 | 12/2007 | Schofield et al. |
| 7,415,116 B1 | 8/2008 | Fels |
| 7,580,795 B2 | 8/2009 | McCarthy et al. |
| 7,657,052 B2 | 2/2010 | Larson et al. |
| 7,675,431 B1 | 3/2010 | Caouette, Sr. |
| 7,720,580 B2 | 5/2010 | Higgins-Luthman |
| 7,791,499 B2 | 9/2010 | Mohan et al. |
| 7,855,755 B2 | 12/2010 | Weller et al. |
| 8,094,040 B1 | 1/2012 | Cornett et al. |
| 8,258,932 B2 | 9/2012 | Wahlstrom |
| 8,275,145 B2 | 9/2012 | Buck et al. |
| 8,319,620 B2 | 11/2012 | Usher et al. |
| 8,355,521 B2 | 1/2013 | Larson et al. |
| 8,392,064 B2 | 3/2013 | Thrun et al. |
| 8,676,427 B1 | 3/2014 | Ferguson et al. |
| 8,824,697 B2 | 9/2014 | Christoph |
| 8,849,557 B1* | 9/2014 | Levandowski .......... G08G 1/01 701/300 |
| 9,224,294 B1 | 12/2015 | St. John |
| 9,275,136 B1 | 3/2016 | Sharifi et al. |
| 9,278,689 B1* | 3/2016 | Delp ................... G08G 1/0965 |
| 9,397,630 B2 | 7/2016 | Wang et al. |
| 9,412,273 B2* | 8/2016 | Ricci ........................ G06F 16/25 |
| 9,417,838 B2 | 8/2016 | Baalu et al. |
| 9,576,208 B2 | 2/2017 | Agnew et al. |
| 9,800,983 B2 | 10/2017 | Wacquant et al. |
| 10,789,840 B2* | 9/2020 | Boykin ............ G08G 1/096725 |
| 2002/0032510 A1 | 3/2002 | Turnbull et al. |
| 2002/0080021 A1 | 6/2002 | Skiver et al. |
| 2002/0110255 A1 | 8/2002 | Killion et al. |
| 2002/0110256 A1 | 8/2002 | Watson et al. |
| 2004/0155795 A1 | 8/2004 | Quintana |
| 2004/0170286 A1 | 9/2004 | Durach et al. |
| 2004/0258252 A1 | 12/2004 | Inoue et al. |
| 2005/0074131 A1 | 4/2005 | McCall et al. |
| 2006/0023892 A1 | 2/2006 | Schultz |
| 2006/0055630 A1 | 3/2006 | Cheang et al. |
| 2007/0008175 A1 | 1/2007 | Johnson et al. |
| 2007/0146127 A1 | 6/2007 | Stilp et al. |
| 2007/0216539 A1 | 9/2007 | D'Antoni et al. |
| 2008/0068187 A1 | 3/2008 | Bonefas et al. |
| 2008/0150786 A1 | 6/2008 | Breed |
| 2009/0028425 A1 | 1/2009 | Cavallaro et al. |
| 2009/0097674 A1 | 4/2009 | Watson et al. |
| 2009/0125311 A1 | 5/2009 | Haulick et al. |
| 2009/0179774 A1 | 7/2009 | Mohan et al. |
| 2009/0322559 A1 | 12/2009 | Yen et al. |
| 2010/0100284 A1 | 4/2010 | Kudo et al. |
| 2011/0199230 A1 | 8/2011 | Stahlin et al. |
| 2011/0296794 A1 | 12/2011 | Thomas et al. |
| 2012/0062743 A1 | 3/2012 | Lynam et al. |
| 2012/0072051 A1 | 3/2012 | Koon et al. |
| 2012/0121113 A1 | 5/2012 | Li |
| 2012/0136559 A1 | 5/2012 | Rothschild |
| 2012/0218412 A1 | 8/2012 | Dellantoni et al. |
| 2012/0230504 A1 | 9/2012 | Kuroda |
| 2013/0049985 A1 | 2/2013 | Eisenson et al. |
| 2013/0222592 A1 | 8/2013 | Gieseke |
| 2013/0223643 A1 | 8/2013 | Sato et al. |
| 2014/0078291 A1 | 3/2014 | Hammarstrom et al. |
| 2014/0218529 A1 | 8/2014 | Mahmoud et al. |
| 2014/0266853 A1 | 9/2014 | Orr et al. |
| 2014/0350927 A1 | 11/2014 | Yamabe et al. |
| 2014/0375476 A1 | 12/2014 | Johnson et al. |
| 2015/0025709 A1 | 1/2015 | Spaulding et al. |
| 2015/0061895 A1 | 3/2015 | Ricci |
| 2015/0065060 A1 | 3/2015 | Stahlin |
| 2015/0066284 A1 | 3/2015 | Yopp |
| 2015/0137998 A1 | 5/2015 | Marti et al. |
| 2015/0142244 A1 | 5/2015 | You et al. |
| 2015/0161458 A1 | 6/2015 | Agnew et al. |
| 2015/0181175 A1 | 6/2015 | Camilleri et al. |
| 2015/0294169 A1 | 10/2015 | Zhou et al. |
| 2015/0296135 A1 | 10/2015 | Wacquant et al. |
| 2015/0348580 A1* | 12/2015 | van Hoff ................ G06T 3/4038 348/38 |
| 2015/0382102 A1 | 12/2015 | Akino |
| 2016/0029111 A1* | 1/2016 | Wacquant .............. H04R 3/005 381/71.4 |
| 2016/0094911 A1 | 3/2016 | Kropf |
| 2016/0191815 A1* | 6/2016 | Annau ................... G06T 19/006 348/38 |
| 2016/0252905 A1 | 9/2016 | Tian et al. |
| 2016/0355124 A1 | 12/2016 | Cervantes Guarneros et al. |
| 2016/0355125 A1* | 12/2016 | Herbert ................... B60K 35/00 |
| 2017/0323540 A1* | 11/2017 | Boykin ................ G08B 13/19613 |
| 2018/0050698 A1* | 2/2018 | Polisson ............... B60W 30/182 |
| 2018/0077506 A1 | 3/2018 | Wacquant et al. |

(56) References Cited

U.S. PATENT DOCUMENTS

| | | | |
|---|---|---|---|
| 2018/0137756 A1* | 5/2018 | Moosaei | G08G 1/096725 |
| 2018/0261237 A1 | 9/2018 | Moore et al. | |
| 2018/0350391 A1 | 12/2018 | Moore et al. | |

FOREIGN PATENT DOCUMENTS

| | | |
|---|---|---|
| WO | 199031637 | 6/1999 |
| WO | 2001037519 A2 | 5/2001 |
| WO | 2003091066 A2 | 11/2003 |
| WO | 2014204794 A1 | 12/2014 |

OTHER PUBLICATIONS

Bendler et al., "Emergency Vehicle Detector," ECE4007 Senior Design Project, Sep. 15, 2008.

Fazenda et al., "Acoustic based safety emergency vehicle detection for intelligent transport systems," IEEE ICCAS-SICE Sep. 2009.

Fragoulis et al., "A Siren Detection System Based on Mechanical Resonant Filters," Sensors 2001, vol. 1, pp. 121-137, ISSN 1424-8220, MDPI, 2001.

Park et al., "Automatic Detection of Emergency Vehicles for Hearing Impaired Drivers," Texas A&M University-Kingsville, EE/CS Department, 2000.

Schröder et al., "Automatic Acoustic Siren Detection in Traffic Noise By Part-Based Models," University of Oldenburg, Germany, May 2013.

Schwander et al., "Effect of two-microphone noise reduction on speech recognition by normal-hearing listeners" Veterans Administration, Journal of Rehabilitation Research and Development, vol. 24, No. 4, pp. 87-92, Fall 1987.

Simmer et al., "Adaptive Microphone Arrays for Noise Suppression in the Frequency Domain" Second Cost 229 Workshop on Adaptive Algorithms in Communications, Bordeaux, 30.92.10.1992.

Zhang et al., "High-speed Noise Cancellation with Microphone Array" Technology Reports, NTT DoCoMo Technical Journal vol. 9, No. 4.

* cited by examiner

VEHICLE ACOUSTIC-BASED EMERGENCY VEHICLE DETECTION

CROSS REFERENCE TO RELATED APPLICATION

The present application claims the filing benefits of U.S. provisional application Ser. No. 62/450,680, filed Jan. 26, 2017, which is hereby incorporated herein by reference in its entirety.

FIELD OF THE INVENTION

The present invention relates generally to a system for a vehicle that utilizes one or more microphones at a vehicle to detect sound at or near the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Such imaging systems may be used to determine other vehicles and/or lights of vehicles, such as headlights and/or taillights and/or flashing lights of emergency vehicles.

SUMMARY OF THE INVENTION

The present invention provides a control system for a vehicle that utilizes a plurality of microphones (preferably arranged in one or more arrays of at least two microphones) disposed at the exterior of the vehicle for sensing sound around the vehicle. An audio processor receives and processes outputs of the microphones to determine or recognize sounds (such as emergency vehicle sirens or the like) detected or sensed at the microphones and to identify or classify the detected sounds and determine the direction from which the sounds are coming from. Responsive to identification of an emergency vehicle siren, the system may generate an alert to a driver of a non-autonomous vehicle or to an occupant of an autonomous vehicle and/or may control a steering system and/or braking system and/or accelerating system of the equipped vehicle to make way for the determined emergency vehicle and/or to pull over the equipped vehicle to the side of the road and stop if it is determined that the detected emergency vehicle is on the road on which the equipped vehicle is traveling and is approaching the equipped vehicle (either from ahead or behind the equipped vehicle).

The system of the present invention thus provides, such as for an autonomous vehicle that is operating autonomously, a means to detect the likes of a siren or other emergency vehicle audible warning being emitted by the likes of a siren of an ambulance or fire engine or police vehicle or the like, and, responsive to such determination, a control of the equipped vehicle generally determines the location of the detected emergency vehicle relative to the equipped vehicle, determines whether the detected emergency vehicle is approaching or receding from the equipped vehicle, and determines proximity of the detected emergency vehicle to the equipped vehicle.

These and other objects, advantages, purposes and features of the present invention will become apparent upon review of the following specification in conjunction with the drawings.

DESCRIPTION OF THE PREFERRED EMBODIMENTS

Figure 1:
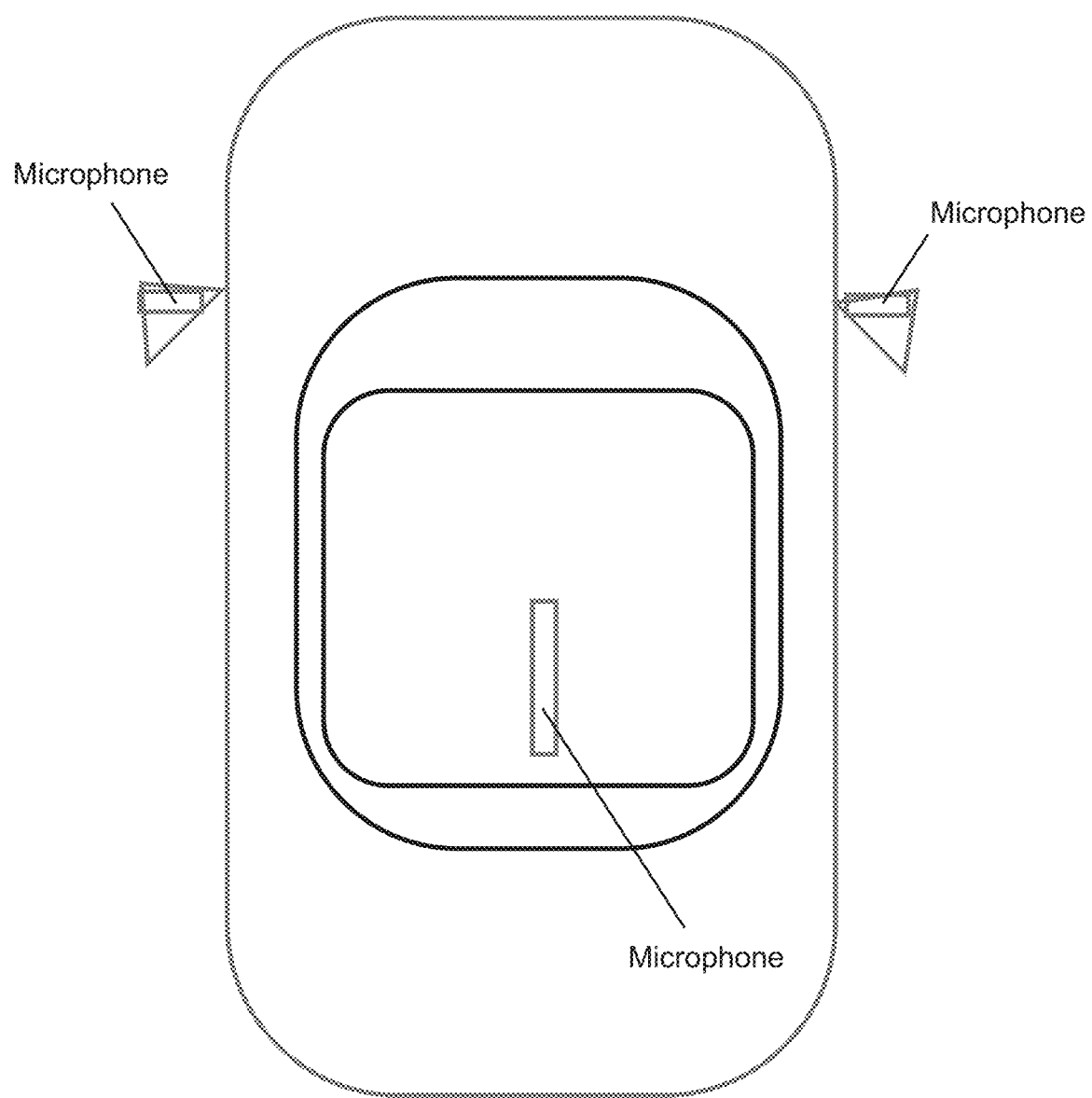
FIG. 1 is a plan view of a vehicle with a system that incorporates microphones in accordance with the present invention.

In-vehicle environments are currently highly insulated against external noise. As a result, it is difficult for the driver to detect the presence of vehicles on emergency travel (such as ambulances, police, fire-fighting trucks and/or the like), especially when all of the vehicle's windows are fully closed and the vehicle's audio system is playing. As inner city roads become ever busier, it becomes important to design and implement systems that alert the driver of the proximity of incoming emergency vehicles and, as importantly, which direction they are approaching from.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

An autonomous vehicle needs to detect emergency vehicles when an emergency vehicle is actively responding to an emergency (such as when the emergency vehicle's sirens and flashing lights are active). The autonomous vehicle will have to react in a specific way that is mandated by local legislation. The autonomous vehicle will have to understand the distance and heading of the emergency vehicle with respect to the emergency vehicle's own position. When the emergency vehicle approaches from behind the autonomous vehicle, the autonomous vehicle may have to drive to the right side of the road and come to a full stop until the emergency vehicle has passed, or on a multi-lane highway, the autonomous vehicle may have to move away from the emergency vehicle in order to let the emergency vehicle pass. If the emergency vehicle approaches from the front of the autonomous vehicle, the autonomous vehicle may have to come to a stop as well (single lane highway), or may be able to continue on without specific reaction (such as if the autonomous vehicle is traveling along an interstate with a barrier). If the emergency vehicle approaches from the left or the right of the autonomous vehicle, the autonomous vehicle needs to be aware that the emergency vehicle may ignore road rules (such as stop signs, traffic lights and the like). The autonomous vehicle should detect an emergency vehicle in conditions when it is not possible to optically 'see' the emergency vehicle (such as in an "urban canyon").

The present invention provides sound based emergency vehicle detection that is operable to detect presence and direction of emergency vehicles using microphones and digital signal processing (DSP) algorithms. The system may communicate signals using a vehicle communication network or bus (such as a controller area network (CAN) bus or the like) and may send signals to sensor fusion or some other module of the vehicle. The system comprises three stages: Acoustic Detection, Direction Extraction and Acoustic Information Relay.

The system of the present invention will recognize an emergency vehicle when the siren is activated but will not recognize an emergency vehicle that drives with flashing lights only. Thus, it is preferred that the invention will be part of a system that will rely on other means to detect active emergency vehicles (such as, for example, V2X communication systems and/or vehicle vision or optical systems or the like).

The system of the present invention uses an array of microphones and a digital signal processor (DSP) to discriminate sirens from ambient noise. The microphone array will be used to triangulate the source and to determine the angle and distance respective to the system. The resulting information may be transmitted on a vehicle communication bus (LIN, CAN, FlexRay or the like).

Sound-based emergency vehicle detection (SBEVD) can provide awareness to the driver of the equipped vehicle that an emergency vehicle is in the area and can provide awareness as to the direction of the sound. Modern automobiles have extensive methods to reduce outside noise which make it more difficult for drivers to detect emergency vehicles (EVs). As such, the system provides situational awareness of the EV in the area. The system also provides direction information of the EV for the driver in relation to the driven or equipped vehicle. This provides further information to the driver such that appropriate driver actions can be taken. The system may also take actions to enhance the driver's ability to hear the emergency vehicle, such actions including, for example, controlling the audio environment within the vehicle, such as turning down the radio or other audio sources. Further enhancements may include approximation of the path of the emergency vehicle to determine actions either for assisted driving or autonomous vehicle control. Potentially, the audio system in the vehicle can be programmed or controlled to provide a filtered or synthesized directional sound to give the driver an enhanced directional feel for the EV location (such as by controlling in-vehicle microphones to generate an EV sound or other alert that, due to the control of multiple in-vehicle microphones, sounds as if it coming from the determined direction of the EV, such as by utilizing aspects of the systems described in U.S. Publication No. US-2016-0029111, which is hereby incorporated herein by reference in its entirety). Networking to adjacent vehicles, GPS and cloud based sensor fusion are all possible enhancements with the SBEVD when implemented in an autonomous vehicle (AV).

The EV's (Emergency Vehicles, including police, fire and paramedic) often use high amplitude screeching sirens to warn road users and pedestrians that the emergency vehicle is approaching. A visual alarm provided by the vehicle detection of the oncoming emergency vehicle sound can improve driver safety for people with hearing impairments.

The SBEVD provides decoding of EV signatures with microphones (i.e., pressure transducers) placed on or disposed at the vehicle (such as at an exterior portion of the vehicle, such as at the exterior rearview mirrors or at the front and/or rear bumpers and/or at a shark-fin antenna or the like). Multiple microphones placed at some physical distance around the vehicle enable triangulation and better discrimination of the sound emanating from the EV. Multiple microphones enable more precision and reduced clutter, multipath, and other impairments in the acoustic environment. Consideration and technical solutions can be made to account for locally generated noise, such as vehicle, road, engine, body vibration and other noise sources which will degrade the acoustical signals. The use of small clusters of microphones can be used to provide beam steering mitigation of these complicating factors.

In general, the further the microphones are apart, the better the triangulation. In a clean environment, a minimum of 3 microphones is required. However, in the real world with impairments and external noise sources, having more microphones is advantageous, safer and more robust. The system of the present invention may include a limited number of microphones dispersed around the automobile. For example, and such as shown in FIG. 1, the system may have microphone clusters on the two exterior side mirrors and one cluster in the shark fin on the roof of the vehicle.

Figure 2:
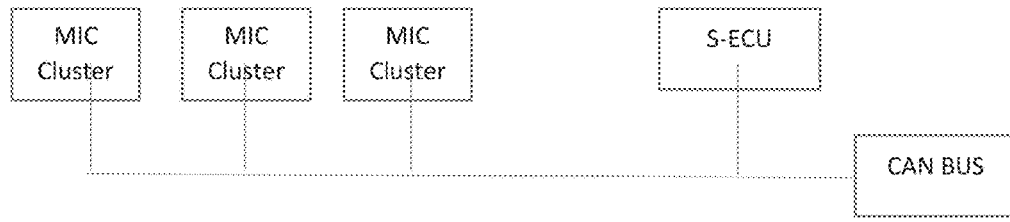
FIG. 2 is a block diagram of the microphones and sound electronic control unit of the system of the present invention.

The computational overhead for acoustics is substantial to provide a high level of confidence against real world impairments. However, the computational overhead is an order of magnitude less than that of vision systems for AVs and thus can be implemented in a reasonably compact and low power system. It is envisioned that the CAN bus can be used to carry information from the microphone clusters to a dedicated acoustic processor for high level filtering and processing. Both the microphone clusters and the Acoustics/Sound-ECU can be accommodated on the vehicle CAN bus (see FIGS. 2-4).

The physical location of the microphones has two conflicting factors. On the one hand, physical protection is important for automotive use given the various environmental challenges. On the other hand, the best location for microphones is open on the surface of the vehicle. Thus, the system may include exposed and hidden microphone placed around the vehicle.

Figure 6:
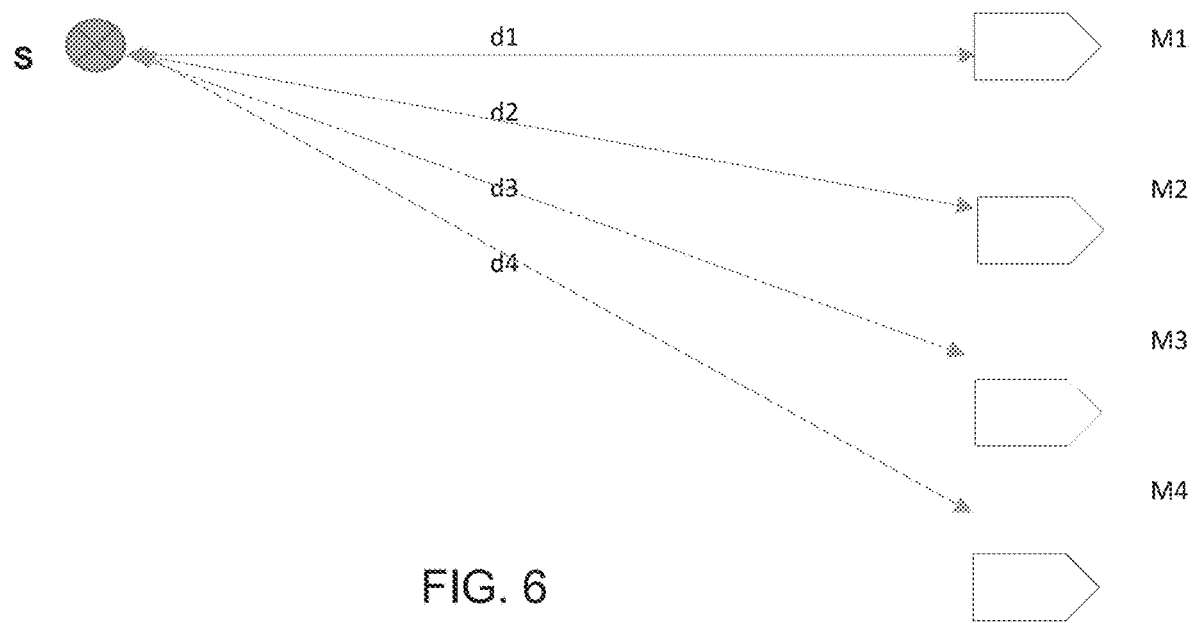
FIG. 6 is a schematic showing a siren emitting sound at respective distances from a plurality of microphones.
Figure 7:
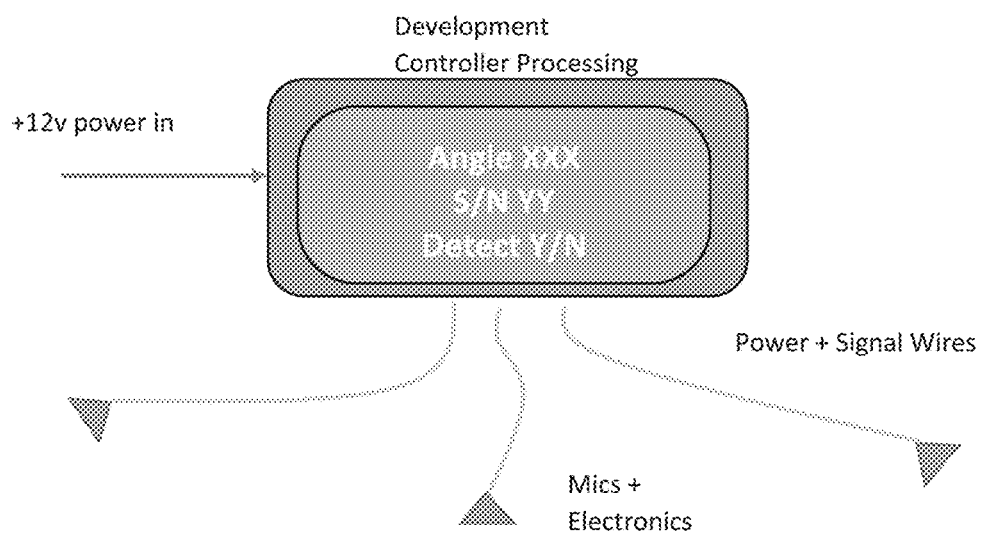
FIG. 7 is a schematic of the controller processing for the system of the present invention.

With reference to FIG. 6, sound waves are generated by the siren S. They travel Doppler shifted to the receiver area that includes the microphones M1, M2, M3, M4. The distance of the microphones to the siren is d1 for M1, d2 for M2, d3 for M3 and d4 for M4. The signals received by microphones M1-M4 will be phase shifted from each other depending on the difference in length that the audio signal travels. The phase shift will be interpreted by a microcontroller and the microcontroller will be able to determine the distance d1-d4. The distance between the microphones is then known and can be used to triangulate the angle and distance of S relative to the middle of the microphone array.

The siren frequency is fixed and programmed in the microcontroller. The microcontroller can use the Doppler shift of the signal (higher frequency means that S is approaching, lower frequency means S is receding) to determine the speed of the siren relative to the vehicle. The system will utilize the vehicle speed information (such as from the vehicle CAN) and the angle information from the microphone array to estimate the emergency vehicle speed by subtracting the vectors. By using map data (which determines the emergency vehicle path determined by the road), the estimate can be refined and the system may determine if the emergency vehicle is traveling along a path that may intersect with the path of travel of the equipped vehicle.

The sound signatures (such as sound signatures of known emergency vehicle sirens) can be pre-programmed in the SBEVD units (so the system may more quickly and accurately detect and identify an emergency vehicle siren). Also if need be, wireless or over the air (OTA) communications could be used to provide updates or localizations for differing jurisdictions of the siren types (so the system may be configured or adapted or programmed for the types of sirens used by emergency vehicles in that geographical location).

The system may process extracted siren signals to obtain the source directions using various techniques, such as sound intensity processing, time delay methods or triangulation. For example, using an intensity based approach, an array of directional microphones may be arranged at the vehicle (such as in a circle facing away from the center of the circle), whereby the system may determine that the sound is coming from the direction where the microphone with the loudest signal is facing. The resolution in direction is limited by the number of microphones, and more microphones allow for enhanced monitoring of more sectors.

Optionally, using a time lag based approach, an array of omnidirectional microphones may be implemented and trigonometry is used to calculate the direction from the time lags between the sensors' sensing of a given sound. Given enough spacing between the microphones, resolution in direction can be very high with just three microphones. Such a configuration is less susceptible to signal to noise issues compared to the intensity based approach.

The system may also determine a frequency shift in the sound to determine if the emergency vehicle is going away from the equipped vehicle or approaching the equipped vehicle (the Doppler Effect). If it is determined that the emergency vehicle is ahead of the equipped vehicle and approaching the equipped vehicle, the system may control the vehicle braking and/or steering to pull the vehicle toward the side of the road. Similarly, if it is determined that the emergency vehicle is approaching an intersection ahead of the equipped vehicle, the system may control the vehicle braking to slow or stop the equipped vehicle before reaching the intersection.

Figure 3:
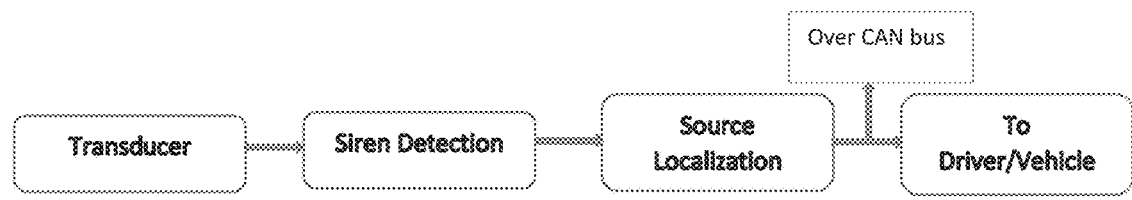
FIG. 3 is a block diagram of the high level architecture of the system of the present invention.
Figure 4:
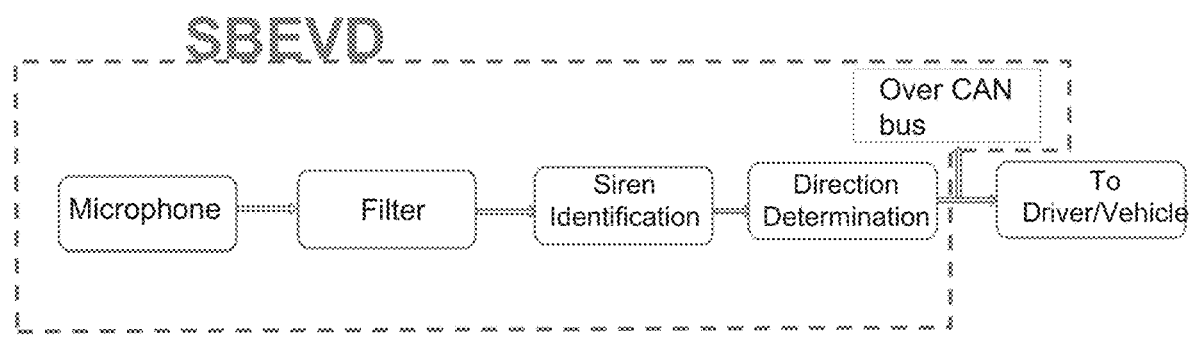
FIG. 4 is another block diagram of a high level architecture, including a filter.
Figure 5:
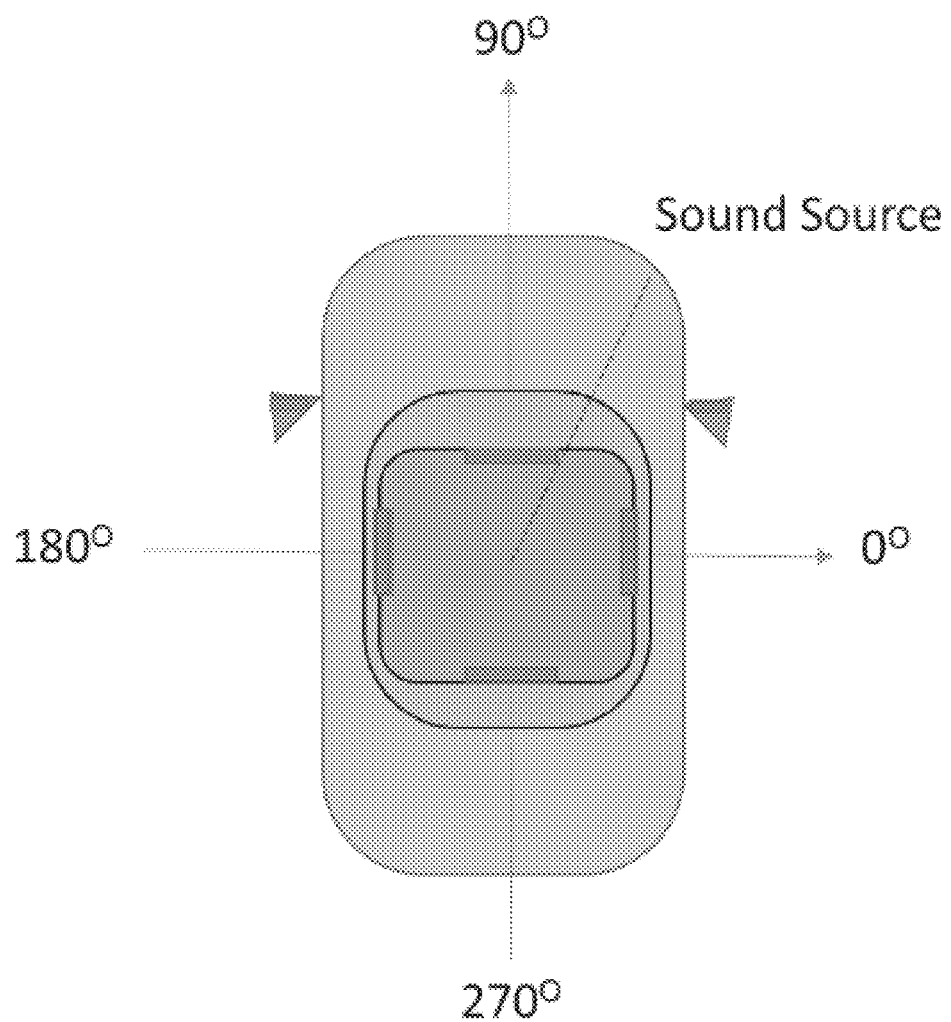
FIG. 5 is a plan view of another vehicle having an array of microphones in accordance with the present invention.

Thus, the system may process output signals of at least three microphones at the vehicle to determine or detect the presence of an emergency vehicle with its siren on. For example, the microphones may communicate outputs to a processor that processes the outputs to detect and/or identify the siren or sound source, and to determine the direction or location of the sound source (see FIGS. 3 and 4). Responsive to such detections and determinations, the system may communicate an alert to the driver of the vehicle and/or may autonomously or semi-autonomously control the steering and/or braking and/or acceleration (powertrain) of the vehicle. As shown in FIGS. 3 and 4, the alert and/or control signals may be communicated over a vehicle network or CAN bus of the vehicle.

By processing the microphone outputs, the system determines the direction of the emergency vehicle relative to the equipped vehicle. For example, an algorithm can determine the time delays between the microphones by finding how much the signals must be shifted to align them, and then can calculate the direction angle from the determined time delays. There is a tradeoff between microphone spacing and sampling frequency, but a spacing of about 1 foot and sampling frequency of about 20 kHz works well. The system may include a bandpass filter and may include filtering and/or pattern recognition to enhance detection and identification of specific sound sources (such as police sirens, etc.).

Preferably, the array of microphones are provided in a unitary module installable at an exterior body location of the vehicle. The microphone or audio module is provided complete with the microphones and any necessary power supply and an audio processor and associated circuitry, and provides an output control signal to the vehicle (preferably via connection to a vehicle communication bus, such as a LIN or LAN or CAN bus). Multiple microphone or audio modules may be installed at the equipped vehicle, such as at a driver-side portion (preferably at or incorporated into a driver-side exterior rearview mirror assembly or at a driver-side camera assembly, whereupon economy can be achieved by sharing circuitry and processors otherwise present in the exterior rearview mirror assembly or camera module or assembly), and such as at a passenger-side portion (preferably at or incorporated into a passenger-side exterior rearview mirror assembly or at a passenger-side camera assembly, whereupon economy can be achieved by sharing circuitry and processors otherwise present in the exterior rearview mirror assembly or camera module or assembly), and such as at a front and/or rear portion of the vehicle (preferably at or incorporated into a front or rear camera assembly, whereupon economy can be achieved by sharing circuitry and processors otherwise present in the camera module or assembly). Alternatively, or additionally, an audio module may be installed at an exterior roof portion of the vehicle, preferably at or along a centerline of the roof, such as at or part of a shark-fin antenna of the vehicle.

Thus, by using an array of microphones and the likes of audio triangulation based on individual audio processing of sound signals received by the respective microphones of the array, the location of the determined EV can be achieved. The system operates independent of visibility constraints (fog, snow, urban canyon). The system is relatively simple (3 or 4 microphones or microphone arrays and one microcontroller) and less expensive than vision systems and the like. The system can be used in non-autonomous vehicles to alert drivers listening to loud music or being hard of hearing.

Upon initial detection and initial determination of the presence and proximity/location of a detected emergency vehicle, sensors, such as cameras, radar sensors and/or lidar sensors can supplement or augment identification and location of the EV as the EV enters the field of view of the camera and/or field of sensing of the radar/lidar sensors. Also, the system may be augmented by optical or V2X systems to detect active emergency vehicles with flashing lights only.

Optionally, for example, the system may operate in conjunction with one or more cameras at the vehicle and/or one or more other sensors. For example, the sound processor may detect the presence of a siren of an emergency vehicle, and a vision system of the equipped vehicle (including one or more cameras and an image processor that processes image data captured by the one or more cameras) may provide confirmation (via image processing of captured image data) that the determined siren/object making the noise is actually part of an emergency vehicle. The vision system may operate to focus its image processing on image data representative of the area of the cameras' fields of view where the microphone system determines the presence of the activated siren. For example, if the microphone system or emergency vehicle detection system determines that an emergency vehicle siren is activated ahead of the equipped vehicle and to the left of the equipped vehicle, the image processor may focus processing of image data captured by the forward viewing camera and may further focus processing of image data captured by a left region imager of the forward viewing camera so as to quickly confirm the presence of the emergency vehicle.

The microphones may be incorporated in camera modules that are disposed at selected locations at the vehicle (such as at the front, rear and sides of the vehicle). Each camera module includes a camera that has a respective field of view (e.g., forward, rearward, sideward) exterior the vehicle. Each camera module includes at least one microphone that senses sounds emanating from exterior the vehicle. The microphones and cameras are collocated at the respective modules and may share components and/or circuitry, and the module may communicate or transmit outputs representative of microphone outputs and captured image data, such as to a central processor or control of the vehicle (such as via a vehicle network or communication bus or the like).

Cohabitation/colocation of the plurality of microphones with the likes of a forward/sideward/rearward viewing vehicular cameras has several advantages. A common microprocessor and/or digital signal processor can be used both for digital sound processing of signals provided by the plurality of microphones, and digital image processing of image data captured by one or more cameras. Moreover, digital image processing of image data captured by the camera may confirm and/or determine presence of an/the emergency vehicle (such as by character recognition of signage or the like on the vehicle indicating it to be an emergency vehicle, or by detection of flashing or strobing of lights on the vehicle indicating it to be an emergency vehicle or the like). For example, a vehicle camera may include in its housing at least one and preferably a plurality of microphones. Furthermore, modern vehicles come equipped with multiple cameras located around the vehicle (such as a front camera, a rear camera, and at least two side cameras). Thus, each camera module may include a camera and a single microphone, whereby the plurality of cameras provide the array of microphones.

The system may process outputs of the microphones to detect a siren or sound indicative of an emergency vehicle, and may determine a direction from the vehicle toward where the sound is emanating from. Responsive to the detected siren and determined source direction, the system may process image data captured by one or more of the cameras so that image data captured by at least one camera that has its field of view at least partially encompassing the area/direction from where the siren or noise is emanating. The system may process the captured image data of at least that camera to identify or confirm that the detected siren is emanating from an emergency vehicle (such as via processing image data to detect characters or signage or icons on the vehicle or to detect flashing lights or the like on the vehicle).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793;

6,876,775; 6,710,770; 6,690,354; 6,678,039; 6,674,895 and/or 6,587,186, and/or International Publication No. WO 2011/090484 and/or U.S. Publication Nos. US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,693,517 and/or 7,580,795, and/or U.S. Publication Nos. US-2014-0375476; US-2014-0218529; US-2013-0222592; US-2012-0218412 and/or US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. An emergency vehicle detection system for a vehicle, said emergency vehicle detection system comprising:
   a plurality of camera modules disposed at a vehicle equipped with said emergency vehicle detection system, wherein said camera modules are spaced apart, one from another, at the equipped vehicle;
   wherein each camera module of said plurality of camera modules comprises a camera having a respective field of view exterior of the equipped vehicle, each said camera capturing image data;
   wherein each of said camera modules comprises at least one microphone for sensing sounds emanating from exterior of the equipped vehicle;
   wherein each of said camera modules comprises circuitry that is shared by said camera and by said at least one microphone of the respective camera module;
   at least one processor disposed at the equipped vehicle, wherein said at least one processor is operable to process image data captured by said cameras, and wherein said at least one processor is operable to process outputs of said microphones;
   wherein said at least one processor processes the outputs of said microphones to detect a sound source indicative of a siren emanating from an emergency vehicle exterior of the equipped vehicle;
   wherein said at least one processor processes the outputs of said microphones to determine (i) the direction of the detected sound source indicative of the siren of the emergency vehicle from the equipped vehicle and (ii) whether the detected sound source is approaching an intersection ahead of the equipped vehicle;
   wherein, responsive to detection of the sound source and determination of the direction of the detected sound source from the equipped vehicle, said at least one processor processes image data captured by at least one of said cameras that has its field of view encompassing the detected sound source to subsequently confirm that the detected sound source is a siren emanating from an emergency vehicle; and
   wherein, responsive to confirmation, via image processing by said image processor of image data captured by the at least one of said cameras, that the detected sound source is a siren emanating from an emergency vehicle, said emergency vehicle detection system at least one of (i) generates an alert to a driver of the equipped vehicle and (ii) controls braking or steering of the equipped vehicle.

2. The emergency vehicle detection system of claim 1, wherein said at least one processor processes the outputs of said microphones to determine whether the detected sound source is approaching the equipped vehicle or moving away from the equipped vehicle.

3. The emergency vehicle detection system of claim 1, wherein, responsive to confirmation that the detected sound source is a siren emanating from an emergency vehicle, said emergency vehicle detection system generates an alert to a driver of the equipped vehicle.

4. The emergency vehicle detection system of claim 1, wherein, responsive to confirmation that the detected sound source is a siren emanating from an emergency vehicle, said emergency vehicle detection system controls braking or steering of the equipped vehicle.

5. The emergency vehicle detection system of claim 1, wherein, responsive to confirmation that the detected sound source is a siren emanating from an emergency vehicle, said emergency vehicle detection system (i) generates an alert to a driver of the equipped vehicle and (ii) controls braking and steering of the equipped vehicle.

6. The emergency vehicle detection system of claim 1, wherein said plurality of camera modules comprises at least three spaced apart camera modules disposed at the exterior of the equipped vehicle.

7. The emergency vehicle detection system of claim 1, wherein said plurality of camera modules comprises at least a driver-side camera module at a driver-side exterior mirror assembly of the equipped vehicle, and a passenger-side camera module at a passenger-side exterior mirror assembly of the equipped vehicle.

8. The emergency vehicle detection system of claim 7, further comprising a center microphone at a shark-fin antenna of the equipped vehicle.

9. The emergency vehicle detection system of claim 7, further comprising a center microphone at a center portion of the equipped vehicle.

10. The emergency vehicle detection system of claim 1, wherein each of said camera modules comprises a plurality of microphones.

11. The emergency vehicle detection system of claim 1, wherein, responsive to detection of the sound source indicative of a siren emanating from an emergency vehicle and the determined direction of the detected sound source, a sensing system of the vehicle processes data captured by at least one non-imaging sensor disposed at the vehicle and having a field of sensing that encompasses the detected sound source to confirm that the detected sound source is a siren emanating from an emergency vehicle.

12. The emergency vehicle detection system of claim 11, wherein the sensing system comprises a sensing system selected from the group consisting of (i) an ultrasonic sensing system, (ii) a LIDAR sensing system and (iii) a RADAR sensing system.

13. An emergency vehicle detection system for a vehicle, said emergency vehicle detection system comprising:
   a plurality of camera modules disposed at a vehicle equipped with said emergency vehicle detection system, wherein said camera modules are spaced apart, one from another, at the equipped vehicle;

wherein said plurality of camera modules comprises at least three spaced apart camera modules disposed at the exterior of the equipped vehicle;

wherein said plurality of camera modules comprises at least a driver-side camera module at a driver side of the equipped vehicle, and a passenger-side camera module at a passenger side of the equipped vehicle;

wherein each camera module of said plurality of camera modules comprises a camera having a respective field of view exterior of the equipped vehicle, each said camera capturing image data;

wherein each of said camera modules comprises at least one microphone for sensing sounds emanating from exterior of the equipped vehicle;

wherein each of said camera modules comprises circuitry that is shared by said camera and by said at least one microphone of the respective camera module;

at least one processor disposed at the equipped vehicle, wherein said at least one processor is operable to process image data captured by said cameras, and wherein said at least one processor is operable to process outputs of said microphones;

wherein said at least one processor processes the outputs of said microphones to detect a sound source indicative of a siren emanating from an emergency vehicle exterior of the equipped vehicle;

wherein said at least one processor processes the outputs of said microphones to determine (i) the direction of the detected sound source indicative of the siren of the emergency vehicle from the equipped vehicle and (ii) whether the detected sound source is approaching an intersection ahead of the equipped vehicle;

wherein, responsive to detection of the sound source and determination of the direction of the detected sound source, said at least one processor processes image data captured by at least one of said cameras that has its field of view encompassing the detected sound source to subsequently confirm that the detected sound source is a siren emanating from an emergency vehicle;

wherein, responsive to confirmation that the detected sound source is a siren emanating from an emergency vehicle, said emergency vehicle detection system at least one of (i) generates an alert to a driver of the equipped vehicle and (ii) controls braking or steering of the equipped vehicle; and wherein said at least one processor processes the outputs of said microphones to determine whether the detected sound source is approaching the equipped vehicle or moving away from the equipped vehicle.

14. The emergency vehicle detection system of claim 13, further comprising a center microphone at a center portion of the equipped vehicle.

15. The emergency vehicle detection system of claim 13, wherein each of said camera modules comprises a plurality of microphones.

16. An emergency vehicle detection system for an autonomous vehicle, said emergency vehicle detection system comprising:

a plurality of camera modules disposed at a vehicle equipped with said emergency vehicle detection system, wherein said camera modules are spaced apart, one from another, at the equipped vehicle;

wherein said plurality of camera modules comprises at least (i) a first camera module disposed at a first side of the equipped vehicle and (ii) a second camera module disposed at a second side of the equipped vehicle;

wherein each camera module of said plurality of camera modules comprises a camera having a respective field of view exterior of the equipped vehicle, each said camera capturing image data;

wherein each of said camera modules comprises at least one microphone for sensing sounds emanating from exterior of the equipped vehicle;

wherein each of said camera modules comprises circuitry that is shared by said camera and by said at least one microphone of the respective camera module;

at least one other microphone disposed at a center portion of the equipped vehicle;

at least one processor disposed at the equipped vehicle, wherein said at least one processor is operable to process image data captured by said cameras, and wherein said at least one processor is operable to process outputs of said microphones of said camera modules and said at least one other microphone;

wherein said at least one processor processes the outputs of said microphones of said camera modules and said at least one other microphone to detect a sound source indicative of a siren emanating from an emergency vehicle exterior of the equipped vehicle;

wherein said at least one processor processes the outputs of said microphones of said camera modules and said at least one other microphone to determine (i) the direction of the detected sound source indicative of the siren of the emergency vehicle from the equipped vehicle and (ii) whether the detected sound source is approaching an intersection ahead of the equipped vehicle;

wherein, responsive to detection of the sound source and determination of the direction of the detected sound source, said at least one processor processes image data captured by at least one of said cameras that has its field of view encompassing the detected sound source to subsequently confirm that the detected sound source is a siren emanating from an emergency vehicle; and wherein, responsive to confirmation that the detected sound source is a siren emanating from an emergency vehicle, said emergency vehicle detection system controls braking or steering of the equipped vehicle.

17. The emergency vehicle detection system of claim 16, wherein said at least one processor processes the outputs of said microphones of said camera modules and said at least one other microphone to determine whether the detected sound source is approaching the equipped vehicle or moving away from the equipped vehicle.

18. The emergency vehicle detection system of claim 16, wherein each of said camera modules comprises a plurality of microphones.

* * * * *